United States Patent [19]

Bosshard

[11] Patent Number: 4,567,015
[45] Date of Patent: Jan. 28, 1986

[54] FRAME FOR STORING NUCLEAR FUEL ELEMENTS

[75] Inventor: Ernst Bosshard, Winterthur, Switzerland

[73] Assignee: Sulzer Brothers Limited, Winterthur, Switzerland

[21] Appl. No.: 472,491

[22] Filed: Mar. 7, 1983

[30] Foreign Application Priority Data

Mar. 12, 1982 [CH] Switzerland .......................... 1528/82

[51] Int. Cl.⁴ ............................................. G21C 19/40
[52] U.S. Cl. ..................................... 376/272; 376/362; 376/462
[58] Field of Search ................ 376/272, 463, 362, 363, 376/462, 364, 352; 211/60 A, 189

[56] References Cited

U.S. PATENT DOCUMENTS

| 3,166,481 | 1/1965 | Braun | 376/362 X |
| 3,801,448 | 4/1974 | Brandstetter et al. | 376/272 X |
| 3,859,533 | 1/1975 | Suvanto | 376/272 |
| 4,042,828 | 8/1977 | Rubinstein et al. | 376/272 |
| 4,115,700 | 9/1978 | Groves | 376/272 |
| 4,143,276 | 3/1979 | Mollon | 376/272 |
| 4,177,385 | 12/1979 | Bevilacqua | 376/272 |
| 4,192,562 | 3/1980 | Bishoff et al. | 211/189 X |
| 4,243,889 | 1/1981 | Weber | 376/272 |
| 4,248,668 | 2/1981 | Dixon et al. | 376/272 |
| 4,348,352 | 9/1982 | Knecht | 376/272 |
| 4,366,115 | 12/1982 | Schlumpf | 376/272 |

FOREIGN PATENT DOCUMENTS

| 2739232 | 3/1979 | Fed. Rep. of Germany . |
| 2742736 | 4/1979 | Fed. Rep. of Germany ...... 376/272 |
| 2835392 | 2/1980 | Fed. Rep. of Germany ...... 376/272 |
| 2943459 | 5/1981 | Fed. Rep. of Germany ...... 376/272 |
| 3017489 | 11/1981 | Fed. Rep. of Germany ...... 376/272 |
| 0855420 | 11/1960 | United Kingdom ................ 376/272 |

Primary Examiner—Deborah L. Kyle
Assistant Examiner—Dan Wasil
Attorney, Agent, or Firm—Kenyon & Kenyon

[57] ABSTRACT

The frame consists of a base and a plurality of square tubes which are secured to the base in upstanding manner. The base consists of rows of intersecting, inter-fitted and inter-welded metal strips which are disposed in mutually perpendicular groups. The tubes are arranged on the strips in a checkerboard fashion with two walls of each tube substantially flush with two parallel strips. In addition, the rows of tubes are offset to one group of metal strips so that the strips are disposed in planes coincident with the longitudinal axes of the tubes in order to support nuclear fuel elements thereon.

9 Claims, 8 Drawing Figures

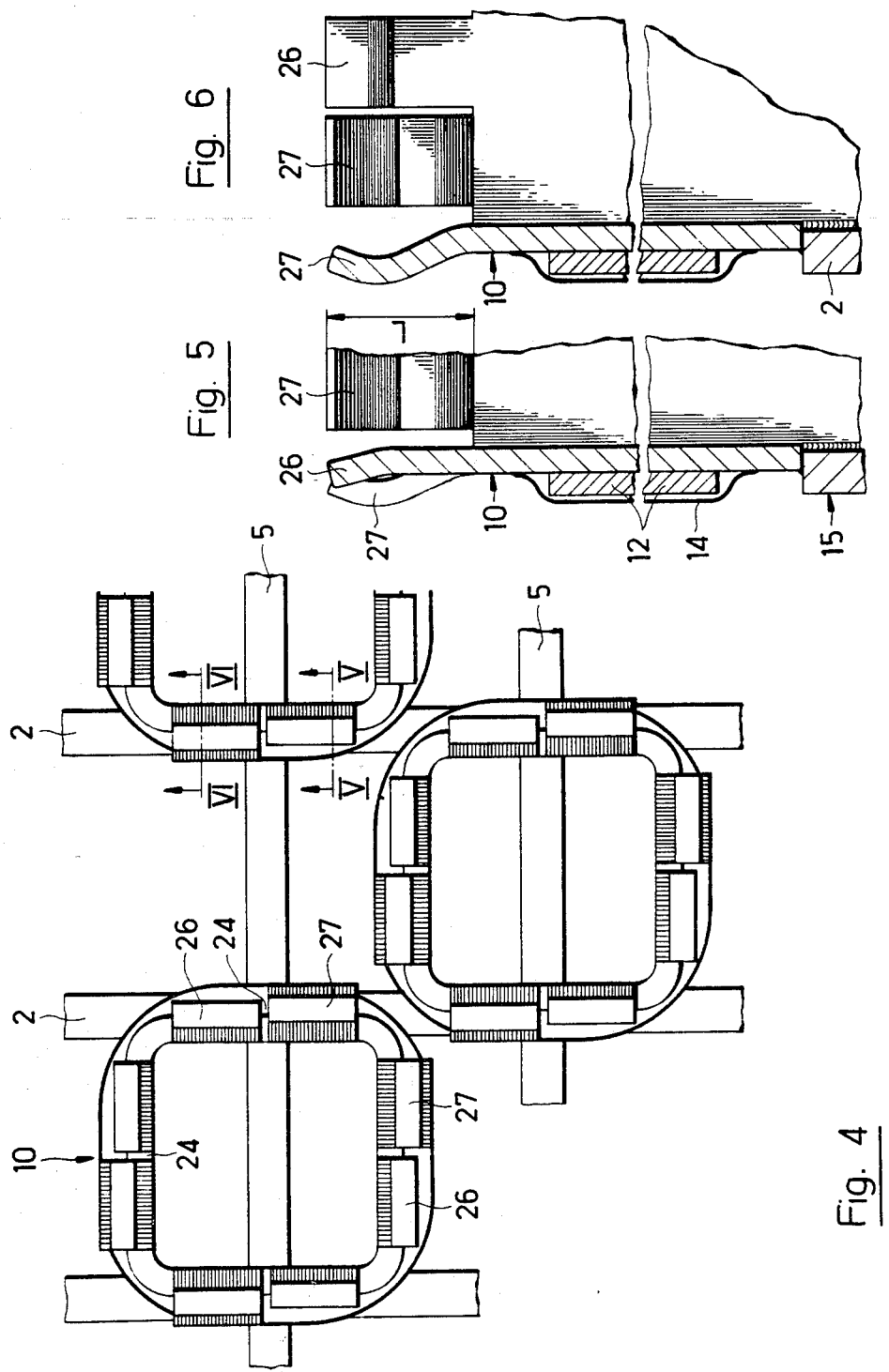

FRAME FOR STORING NUCLEAR FUEL ELEMENTS

This invention relates to a frame for storing nuclear fuel elements.

As is known, various types of frames have been provided for the storage of nuclear fuel elements. Generally, the frames consist of a base and a plurality of upstanding square tubes which are secured at one end to the base and which carry neutron-absorbent plates. In one known construction, as described in German O.S. No. 29 21 482, the base consists of a baseplate which is stiffened by vertical ribs and which is machined at the top. In this construction, the square tubes are secured to the baseplate by screws which extend through flanges at the bottom end of the square tubes.

Although the known frame has an advantage in that the square tubes can be individually fitted to the baseplate and, if necessary, individually removed from the baseplate, the frame is relatively complicated and manufacture is expensive. In addition, the use of flanges on the square tubes is a complicated matter which is also expensive to manufacture. Also, large machines are required for the machining operations, particularly for the production of the baseplates.

Accordingly, it is an object of the invention to provide a frame for storing nuclear fuel elements which is made of relatively simple parts.

It is another object of the invention to provide a nuclear fuel element storage frame which can be manufactured in a relatively inexpensive manner.

It is another object of the invention to provide a frame for storing nuclear fuel elements which is constructed of relatively simple parts.

Briefly, the invention provides a frame for storing nuclear fuel elements which is comprised of a base and a plurality of square tubes which are secured to the base in upstanding manner. The base is constructed of a plurality of intersecting inter-fitted metal strips which are disposed in two mutually perpendicular groups. Each tube has a first pair of parallel walls parallel to one group of the metal strips as well as a second pair of parallel walls substantially flush with a pair of strips of the other group of metal strips.

Because of the absence of any flanges on the square tubes, the fabrication of the base can be carried out in a simplified manner. Furthermore, this permits a considerable savings of expensive material.

The frame is also provided with a plurality of neutron-absorbent plates on each of the tubes.

The strips of one group in the frame are disposed in planes which are coincident with the longitudinal axes of the tubes. This provides, in a very simple way, vertical supports for the fuel elements which are to be stored in the square tubes while, at the same time, stiffening the base.

The tubes are secured to the base in rows and in a checkerboard array. In this regard, the tubes are disposed on the base, for example according to the black squares of a chessboard. In addition, the tubes in each row which is parallel to a strip on which the fuel elements are to be supported are spaced apart a distance equal to or greater than an inside width of a tube in the row with a tolerance of not more than five millimeters. This provides a further savings in production and material costs since the number of square tubes required is reduced to about half the number of fuel elements to be accommodated.

The neutron-absorbent plates are arranged on each tube to form a square tube system. In addition, a protective metal sheet is disposed over the plates on each tube.

These and other objects and advantages of the invention will become more apparent from the following detailed description taken in conjunction with the accompanying drawings wherein:

FIG. 4 illustrates a top view of the frame constructed in accordance with the invention with the material thicknesses being shown on an exaggerated scale;

FIG. 5 illustrates a vertical sectional view taken on line V—V of FIG. 4;

FIG. 6 illustrates a vertical sectional view taken on line VI—VI of FIG. 4;

FIG. 7 illustrates a view similar to FIG. 5 of a modified top of a square tube in accordance with the invention; and FIG. 8 illustrates a view of a top of a further modified tube in accordance with the invention.

Figure 1:
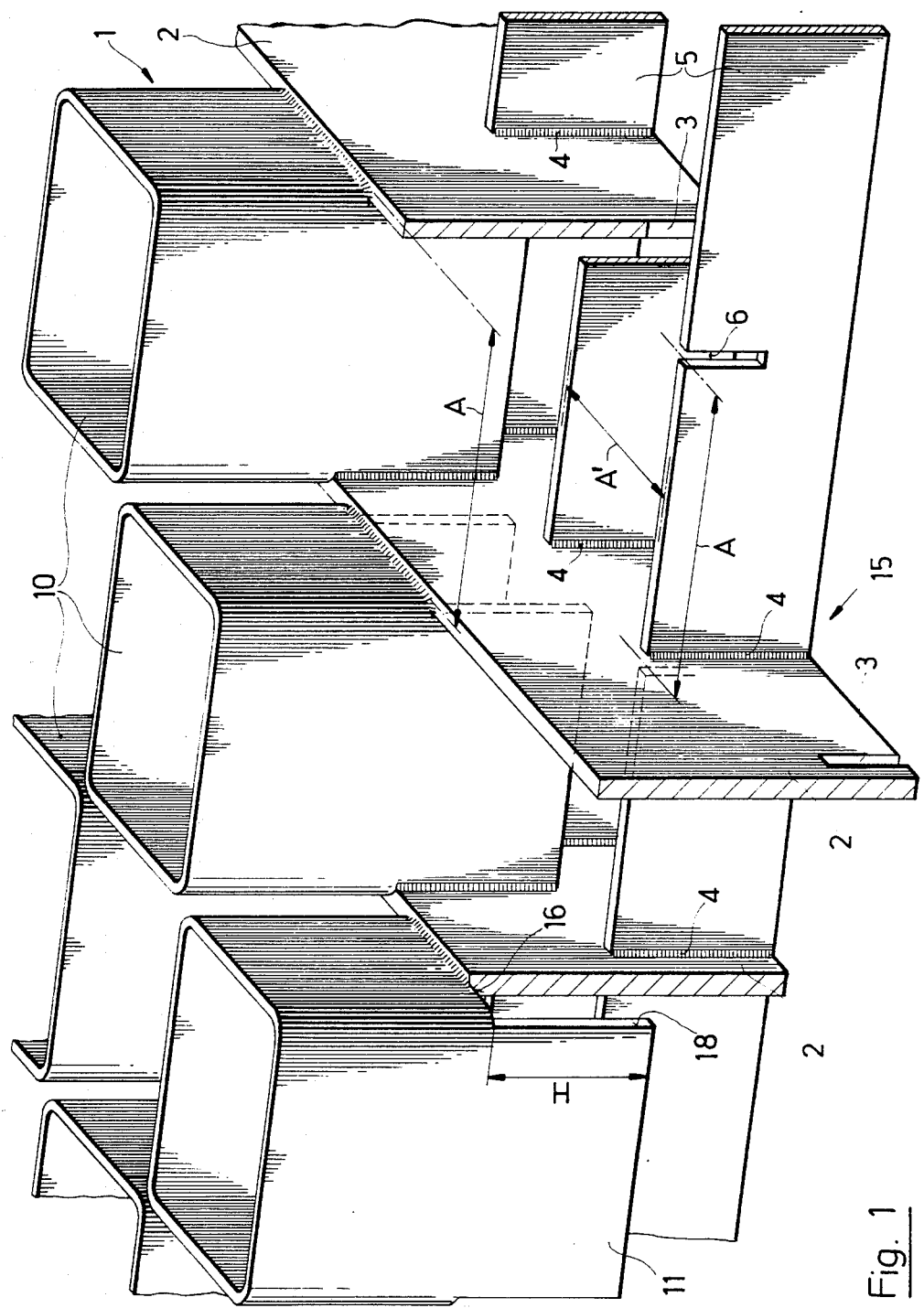
FIG. 1 illustrates a perspective view of a frame constructed in accordance with the invention with the height of the square tubes being shown in an exaggerated shortened state.

Referring to FIG. 1, the frame 1 comprises a base 15 and a plurality of square tubes 10 which are secured to the base 15 in upstanding manner by welding so as to receive nuclear fuel elements (not shown).

Figure 2:
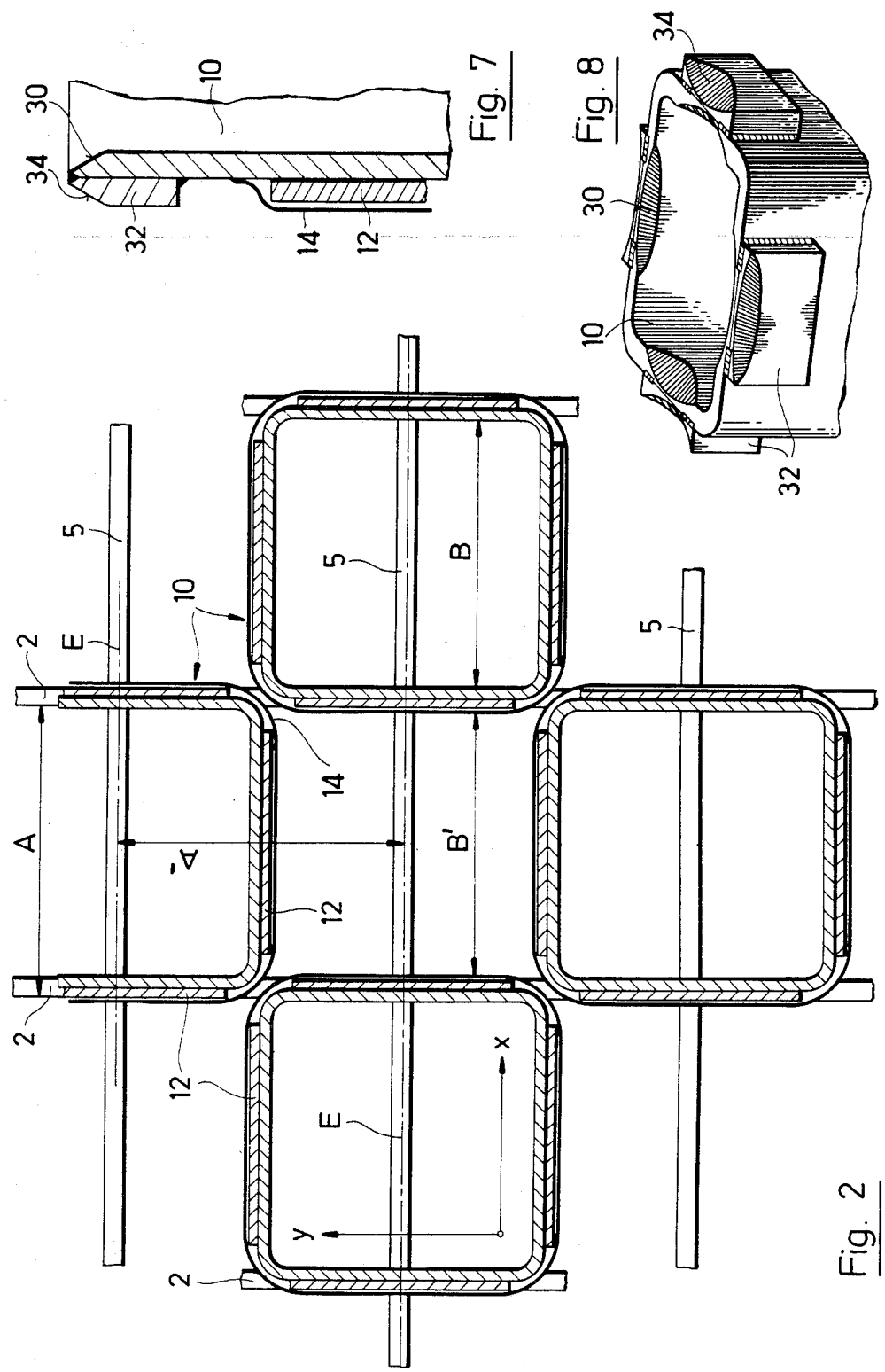
FIG. 2 illustrates a top view of the frame of FIG. 1.

The base 15 is comprised of a plurality of intersecting inter-fitted metal strips 2, 5 which are disposed in two mutually perpendicular groups (see FIG. 2). One group of strips 2 extends longitudinally in parallel relationship in vertical planes which are spaced apart by an amount A (see FIG. 2). The main direction of these longitudinal strips 2 is denoted by y in FIG. 2. As shown in FIG. 1, the bottom of each strip 2 is formed with incisions or slots 3 on a uniform pitch A'.

The other groups of strips 5 extend in rows transverse to the strips 2. The main direction in which these strips 5 extend is denoted by x in FIG. 2. These strips 5 also extend in vertical planes on a pitch A'. Each transverse strip 5 also has incisions or slots 6 at the top on a pitch equal to the distance A, i.e., the pitch of the longitudinal strips 2.

The incisions of the longitudinal strips 2 are so fitted with the incisions of the transverse strips 5 that the bottom edges of the longitudinal strips 2 and the transverse strips 5 are situated in the same horizontal plane. In addition, the transverse strips 5 are half the width of the longitudinal strips 2 so that the tops of the respective strips 2, 5 are at a different height. As indicated in FIG. 1, the strips 2, 5 are interconnected by vertical weld seams 4.

As indicated in FIGS. 1 and 2, the arrangement of the longitudinal and transverse strips 2, 5 gives the base 15 the form of a square grid since the distances A and A' are identical.

The square tubes 10 are provided with rounded edges and are disposed on the base 15 in rows and in checkerboard array. For example, the tubes 10 are arranged in locations corresponding to the black squares of a chessboard while the free spaces between the tubes represent the white chessboard squares.

The tubes 10 are arranged so that two parallel walls are parallel to the transverse strips 5 while the remaining two parallel walls are substantially flush with the longitudinal strips 2. As indicated in FIG. 2, the tubes 10 are offset from the transverse strips 5 by an amount equal to one half the pitch A'. As a result of the offsetting, the transverse strips 5 extend in planes E which are coincident with the longitudinal axes of the tubes 10. Further, the tubes 10 in each row parallel to the transverse strips 5 are spaced apart a distance B' equal to or greater than an inside width B of a tube in the row with a tolerance of not more than five millimeters. As indicated in FIG. 2, the inside width B' of the empty spaces is equal to the inside width B of the square tubes 10.

The tubes 10 are of elongated length, for example the height of each tube 10 is twenty times the distance A.

In order to secure a tube 10 to the base 15, rectangular parts of the bottom ends of the walls of the tube 10 are removed by milling on two opposite sides, i.e., the sides coinciding with the longitudinal strips 2. This forms two horizontal milled surfaces 16 (see FIG. 1) and four vertical milled surfaces 18 on each tube 10. The depth of the milling cut is so selected that the rectangular wall portions 11 of a height H remaining between each pair of vertical milled surfaces 18 fit between two longitudinal strips 2. The square tubes are fillet-welded to the longitudinal strips 2 along the milled surfaces 16, 18. As shown in FIG. 2, each tube 10 has a pair of parallel walls substantially flush with two longitudinal strips 2.

The frame is also provided with neutron-absorbent plates 12. These plates 12 are of a material which is a high neutron absorber, for example boron-containing aluminum or a suitable plastic. The plates are provided on the outside surfaces of each square tube 10 over the greater part of the height of the tube 10 but outside of the region of the base 15. The plates are also covered by a thin metal sheet 14 which may be welded all around to the square tube 10 in sealtight relation or which may have passage apertures for a fluid coolant.

The frame 1 thus has a very rigid base 15 which can be formed with a minimum of welding work and little material. Further, the wall flaps 11 of the square tubes 10 which are produced by milling form rigid connecting elements for the longitudinal strips 2. A portion of the square tube wall part situated above the rectangular wall flaps 11 also contributes to the stiffness of these connecting elements.

As a result of offsetting the wall flaps 11 of the square tubes 10 by an amount equal to half the pitch A' in relation to the transverse strips 5, channels which extend in zigzag fashion and parallel to the longitudinal strips 2 are left free for the supply of coolant to the bottom ends of the square tubes 10 and to the storage spaces between the square tubes 10. Since the fuel elements are supported on the transverse strips 5 only by a central stump projecting at their bottom end, there is sufficient free cross-section left laterally beside this stump for the coolant flowing over the transverse strips 5.

Figure 3:
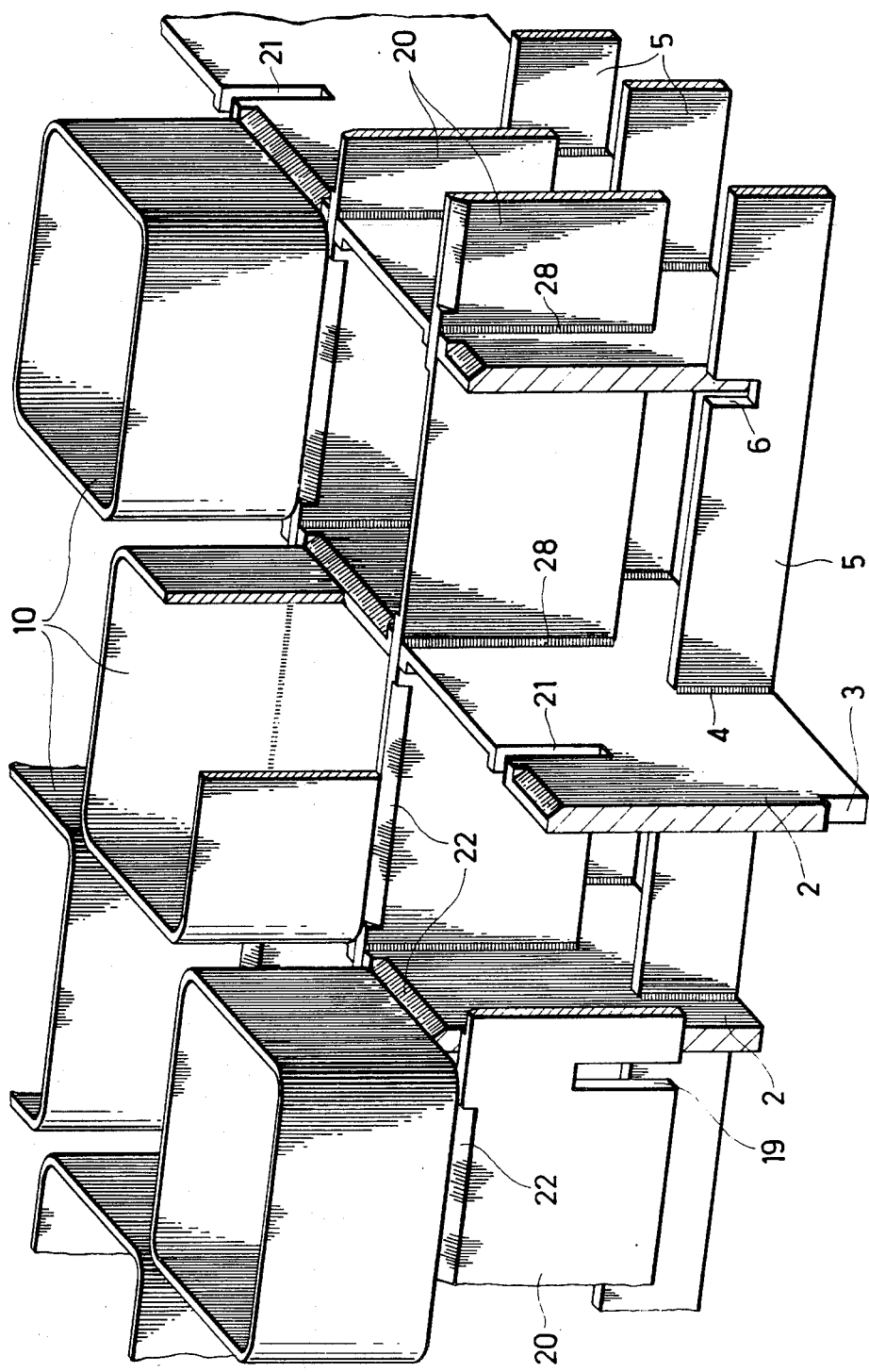
FIG. 3 illustrates a perspective view of a modified frame constructed in accordance with the invention.

Referring to FIG. 3, wherein like reference characters indicate like parts as above, the base may also be provided with upper strips 20 in addition to the transverse strips 5. As indicated, these upper strips 20 are offset by half the pitch A from the transverse strips 5 and extend in vertical planes. In addition, each strip 20 has incisions or slots 19 starting from the bottom edge. The longitudinal strips 2 have matching incisions or slots 21 starting from the top edge so that the top strips 20 can be inter-fitted into the longitudinal strips 2.

As shown in FIG. 3, the top strips 20 are welded to the longitudinal strips 2 via vertical seams 28 and have upper surfaces flush with the walls of the tubes 10 thereto. Further, the longitudinal strips 2 and the top strips 20 have inclined milled cuts 22 in the region of their top edges so that the thickness of these strips 2, 20 can be matched to the wall thickness of the square tubes 10 in this area. In this case, the square tubes 10 are cut off straight at the bottom and are welded to the longitudinal strips 2 and the top strips 20 over the length of the milled cuts 22.

The advantage of the frame shown in FIG. 3 is that less milling work has to be performed on the square tubes 10. However, this advantages is obtained at the expense of increased welding work.

Referring to FIGS. 4 to 6, the top ends of the square tubes 10 have edges which are milled out over a length L (see FIG. 5). The wall portions remaihing between each two milled cuts are divided into two flaps 26, 27 by a longitudinal cut 24 so that four flaps 26, 27 form on each square tube. As shown in FIG. 6, the flaps 27 are bent slightly outwards at the base and slightly inwards at about mid-height. As shown in FIG. 5, the flaps 26 are bent only once, i.e., slightly outwards at mid-height. The flaps 26 or 27 adjacent the same edge of a square tube 10 are of identical construction in each case, there being symmetry with respect to the diagonal. When a fuel element is introduced into a square tube or into a storage space between four adjacent square tubes, the element is centered by the flaps 26, 27, i.e., at those inclined surfaces of the flaps formed by the bent portions.

Referring to FIG. 7, the top end of each square tube 10 may be milled at an angle on the inside to form a guide surface 30. In addition, a portion of strip material 32 is welded to the outside of the square tube 10 and has an outer inclined guide surface 34 at the top. This configuration is provided on each of the walls of the square tubes 10. While the guide surfaces 30 serve to center a fuel element introduced into the square tube 10, the corresponding outer guide surfaces 34 perform the same function for a fuel element introduced into the storage spaces between four square tubes 10.

Referring to FIG. 8, the top end of a square tube 10 may be provided with four strip material portions 32 on the outside as above. In this case, however, the guide surfaces 30, 34 do not form planes but conical surfaces, the axis of which coincides with the longitudinal axis of the square tube. This embodiment is particuarly suitable if the fuel elements are formed at the bottom ends as bodies of revolution with respect to their longitudinal axis. Thus, there is less surface pressure when the fuel elements are introduced into the tubes 10.

The top ends of the adjacent square tubes may also be provided with guides which support the square tubes horizontally with respect to one another but which allow relative vertical movements which may result from an uneven heating of the tubes. Square or round material portions can be used, for example, for guides of this kind, and may be fitted into pockets formed by the edge milled cuts between adjacent square tubes. Alternatively, narrow flaps could be bent diagonally in the region of the edges of a square tube to engage in diagonally milled grooves in the adjacent square tubes.

The invention thus provides a frame for storing nuclear fuel elements which is of relatively rigid construction and which can be fabricated in a relatively inexpensive manner. Further, the invention provides a frame which can be made of relatively simple components.

What is claimed is:

1. A frame for storing nuclear fuel elements, said frame comprising a base having a plurality of intersecting interfitted metal strips, said strips being disposed in two mutually perpendicular groups; and a plurality of square tubes secured to said base in upstanding manner; each said tube having a first pair of parallel walls parallel to one group of said metal strips with said strips of said one group disposed in planes coincident with the longitudinal axes of said tubes, each said tube having a second pair of parallel walls flush with a pair of strips of the other group of said metal strips.

2. A frame as set forth in claim 1 which further comprises a plurality of neutron-absorbent plates on each said tube.

3. A frame as set forth in claim 1 wherein said tubes are secured to said base in rows and in a checkerboard array and wherein said tubes in each row parallel to said strips of said one group are spaced apart a distance (B') equal to or greater than an inside width (B) of a tube of said row with a tolerance of not more than five millimeters.

4. A frame as set forth in claim 3 wherein said neutron-absorbent plates on each tube form a square tube system and which further comprises a protective metal sheet over said plates.

5. A frame as set forth in claim 1 wherein said tubes are secured to said base in rows and in a checkerboard array and wherein said tubes in each row parallel to said strips of said one group are spaced apart a distance (B') equal to or greater than an inside width (B) of a tube of said row with a tolerance of not more than five millimeters.

6. A frame as set forth in claim 1 which further comprises a plurality of neutron-absorbing plates on each said tube forming a square tube system and a protective metal sheet over said plates on each tube.

7. A frame as set forth in claim 1 wherein said strips of said one group are of less height than said strips of said other group.

8. A frame as set forth in claim 1 which further comprises a third group of strips parallel to said strips of said one group and having upper surfaces flush with said first pair of parallel walls of said tubes.

9. A frame as set forth in claim 8 wheren said strips of said third group are of less height than said strips of said other group.

* * * * *

UNITED STATES PATENT AND TRADEMARK OFFICE
CERTIFICATE OF CORRECTION

PATENT NO. : 4,567,015

DATED : January 28, 1986

INVENTOR(S) : Ernst Bosshard

It is certified that error appears in the above-identified patent and that said Letters Patent is hereby corrected as shown below:

Column 4, line 6 change "thereto." to -thereat.-

Column 4, line 20 change "remaihing" to -remaining-

Column 6, line 25 change "wheren" to -wherein-

Signed and Sealed this

Eighth Day of July 1986

[SEAL]

Attest:

Attesting Officer

DONALD J. QUIGG

Commissioner of Patents and Trademarks